United States Patent [19]

Akagi et al.

[11] Patent Number: 5,038,903
[45] Date of Patent: Aug. 13, 1991

[54] ONE-WAY CLUTCH

[75] Inventors: Masatoshi Akagi; Wasaku Hosoda, both of Saitama, Japan

[73] Assignee: Honda Giken Kogyo Kabushiki Kaisha, Tokyo, Japan

[21] Appl. No.: 316,562

[22] Filed: Feb. 27, 1989

Related U.S. Application Data

[63] Continuation of Ser. No. 21,831, Mar. 4, 1987, abandoned.

[30] Foreign Application Priority Data

May 16, 1986 [JP] Japan .............................. 61-72573[U]

[51] Int. Cl.$^5$ ............................................. F16D 41/07
[52] U.S. Cl. .................................. 192/41 A; 192/45.1
[58] Field of Search ...................... 192/41 R, 41 A, 42, 192/45, 45.1; 188/82.8; 74/7 R, 7 C

[56] References Cited

U.S. PATENT DOCUMENTS

| 2,630,896 | 3/1953 | Dodge | 192/45.1 |
|---|---|---|---|
| 2,683,509 | 7/1954 | Jandasek | 192/45.1 |
| 2,832,450 | 4/1958 | Wade | 192/45.1 |
| 3,545,581 | 12/1970 | Kent | 192/45.1 |
| 3,702,649 | 11/1972 | Geise et al. | 192/41 A |
| 3,844,391 | 10/1974 | Hallerberg | 192/41 A |
| 3,942,616 | 3/1976 | Elmore | 192/45 |
| 4,018,318 | 4/1977 | Hallerberg | 192/41 A |
| 4,089,395 | 5/1978 | Fogelberg | 192/41 A |
| 4,360,093 | 11/1982 | Wakabayashi et al. | 192/41 A |
| 4,422,537 | 12/1983 | Ritter et al. | 192/45 |

FOREIGN PATENT DOCUMENTS

| 2348733 | 4/1975 | Fed. Rep. of Germany | 192/45 |
|---|---|---|---|
| 3233073 | 10/1983 | Fed. Rep. of Germany . | |
| 3502882 | 8/1985 | Fed. Rep. of Germany . | |
| 60-104818 | 6/1985 | Japan | 192/41 A |
| 412898 | 7/1934 | United Kingdom . | |
| 826548 | 1/1960 | United Kingdom . | |
| 863930 | 3/1961 | United Kingdom . | |
| 1428476 | 3/1976 | United Kingdom . | |
| 1475099 | 6/1977 | United Kingdom . | |

Primary Examiner—Richard Lorence
Attorney, Agent, or Firm—Lyon & Lyon

[57] ABSTRACT

A one-way clutch having a number of cams arranged circumferentially between an outer clutch member and an inner clutch member and held between a pair of ring-shaped side plates. A friction member is interposed between one of the clutch members and at least one of the side plates to prevent mutual sliding rotation thereof. The friction member having resiliency is pressed against one of the clutch member to produce intensive frictional force, so that the one-way clutch rotates together with one of the clutch members at all times, thereby wearing of the one-way clutch can be avoided.

9 Claims, 10 Drawing Sheets

5,038,903

ONE-WAY CLUTCH

This application is a continuation of U.S. application Ser. No. 021,831, filed Mar. 4, 1987, now abandoned.

BACKGROUND OF THE INVENTION

The field of the present invention is a one-way clutch, and more particularly a one-way clutch for use in an automotive engine starter.

One-way clutches are widely used in various devices in order to transmit rotative power from one shaft to the other in a prescribed direction, or to allow rotative power to be transmitted from one shaft to the other while the shafts are rotating in one direction and to prevent rotative power from being transmitted from the other shaft to said one shaft.

In automotive engine starters, the rotation of a starter motor is transmitted to a crankshaft, but the rotation of the crankshaft should not be transmitted to the starter motor. To this end, a one-way clutch is disposed between the crankshaft and a driven gear which is rotated by the starter motor.

In a motorcycle, for example, as shown in FIG. 1, a driven gear 04 which can be rotated by a starter motor (not shown) via an intermediate gear 01 is rotatably mounted by a bearing 03 on an end of a crankshaft 02 of an internal combustion engine. The driven gear 04 has a boss 04a over which there is fitted a one-way clutch 010 that is held in position by a rotor 06 of an AC generator 05 on the distal end of the crankshaft 02 and an outer clutch member 08 fixed by bolts 07 to the rotor 06, the rotor 06 and the outer clutch member 08 being collectively referred to herein as the "outer clutch means." The rotation of the starter motor is transmitted via the intermediate gear 01, the driven gear 04, the one-way clutch 010, and the outer clutch means, including rotor 06 and the outer clutch member 08 to the crankshaft 02 for starting the internal combustion engine. When the internal combustion engine is started, the crankshaft 02 is rotated thereby to rotate the rotor 06 and the outer clutch member 08. However, the driven gear 04 is not rotated because of the one-way clutch, and hence the rotation of the internal combustion engine is not transmitted to the starter motor.

FIG. 2 shows the one-way clutch 010 used in the engine starter as described above. The one-way clutch 010 has a number of cams 013 disposed between a pair of ring-shaped side plates 011, 012. The side plates 011, 012 are engaged by a wire cage 015 which alternately engages engaging portions 014 (FIG. 3) projecting in a staggered manner from the inner peripheral edges of the side plates, and the cams 013 are sandwiched and held in position between the side plates 011, 012. A ring-shaped coil spring 018 is wound through grooves 017 defined in the cams 013 and opening outwardly of the one-way clutch for preventing the cams 013 from being dislodged.

In the one-way clutch 010 thus constructed, the inner periphery thereof is fitted over the boss 04a of the driven gear 04, and the outer periphery thereof is retained by the outer clutch member 08. The outer side of the side plate 011 is engaged by the rotor 06 of the AC generator 05 for preventing dislodgement of the clutch.

It is desirable that the one-way clutch 010 thus assembled in position be rotated with the crankshaft 02 by the internal combustion engine, i.e., the outer clutch means, including the rotor 06 of the AC generator 05 and the outer clutch member 08.

To meet the above requirement, the outer peripheral edge of the side plate 011 is bent slightly outwardly into a flange 011a, which is sandwiched between the rotor 06 and the outer clutch member 08 for allowing the side plate 011 to be rotated with the rotor 06 and the outer clutch member 08. However, since the side plate 011 is simply sandwiched between the rotor 06 and the outer clutch member 08, although the side plate 011 tends to rotate with the rotor 06 and the outer clutch member 08, the side plate 011 may rotate more slowly than the rotor 06 and the outer clutch member 08 or may not rotate at all dependent on the friction between these members. If slippage takes place between the rotor 06 and the outer clutch member 08, and the one-way clutch 010, then the portions of the flange 011a and the cams 013 which contact the rotor 06 or the outer clutch member 08 undergo wear.

SUMMARY OF THE INVENTION

The present invention has been made in an attempt to allow a one-way clutch to be rotated with the outer clutch means including a rotor and an outer clutch member while a crankshaft is being rotated by an internal combustion engine.

There is provided in accordance with the present invention a one-way clutch having a number of cams arranged circumferentially between an outer clutch member and an inner clutch member and held between a pair of ring-shaped side plates, characterized in that a friction member is interposed between one of said clutch members and at least one of said side plates to prevent mutual sliding rotation thereof.

According to the present invention, for example, the outer clutch member is engaged with the side plate by means of the friction member with considerable frictional force. Therefore, the side plate can be rotated with the outer clutch member, so that no wearing of the one-way clutch by relative slippage occurs.

The foregoing and other objects, features and advantages of the invention will be apparent from the following more particular description of the preferred embodiments of the invention, as illustrated hereinafter.

DETAILED DESCRIPTION OF THE PREFERRED EMBODIMENTS

Figure 4:
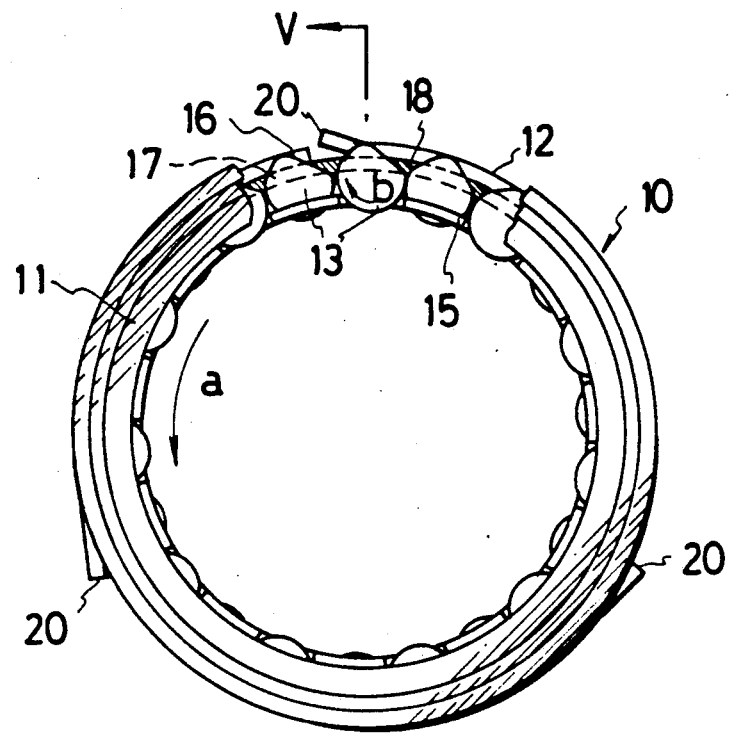
FIG. 4 is a front elevational view, partly cut away, of a one-way clutch according to a first embodiment of the present invention.
Figure 5:
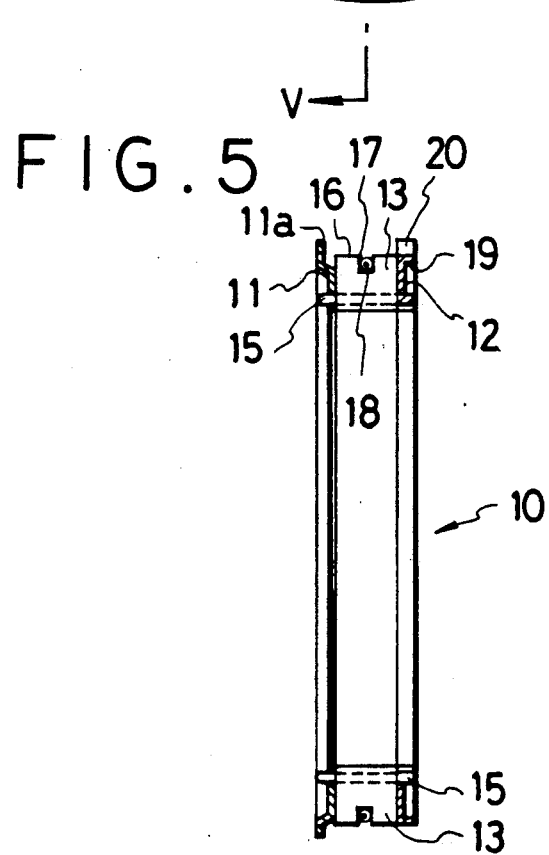
FIG. 5 is a cross-sectional view taken along line V—V of FIG. 4.
Figure 6:
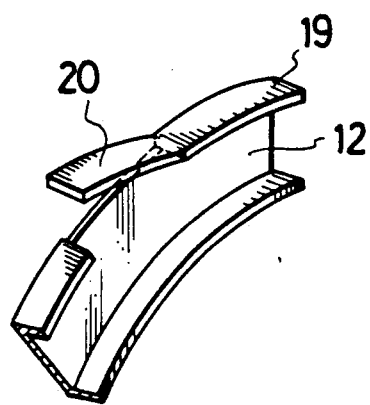
FIG. 6 is a perspective view of a portion of a side plate of the one-way clutch.

Referring first to FIGS. 4~6, a first embodiment of a one-way clutch in accordance with the present invention will be described.

As shown in FIG. 4, a one-way clutch 10 has a number of cams 13 disposed between a pair of ring-shaped side plates 11, 12 and arranged circumferentially. The side plates 11, 12 are engaged by a wire cage 15 which alternately engages engaging portions projecting in a staggered manner from the inner peripheral edges of the side plates. The cams 13 are sandwiched from opposite sides. Each of the cams 13 has a short cylindrical shape having an axis parallel to the axis of the one-way clutch 10 and includes, as a cam surface 16, a peripheral surface facing radially outwardly of the one-way clutch 10. The cam surface 16 has a groove 17 extending in the circumferential direction of the one-way clutch 10. A ring-shaped coil spring 18 is fitted in and along the grooves 17 of the respective cams 13 to prevent the cams 13 from being dislodged from the side plated 11, 12 and the wire cage 15.

Figure 1:
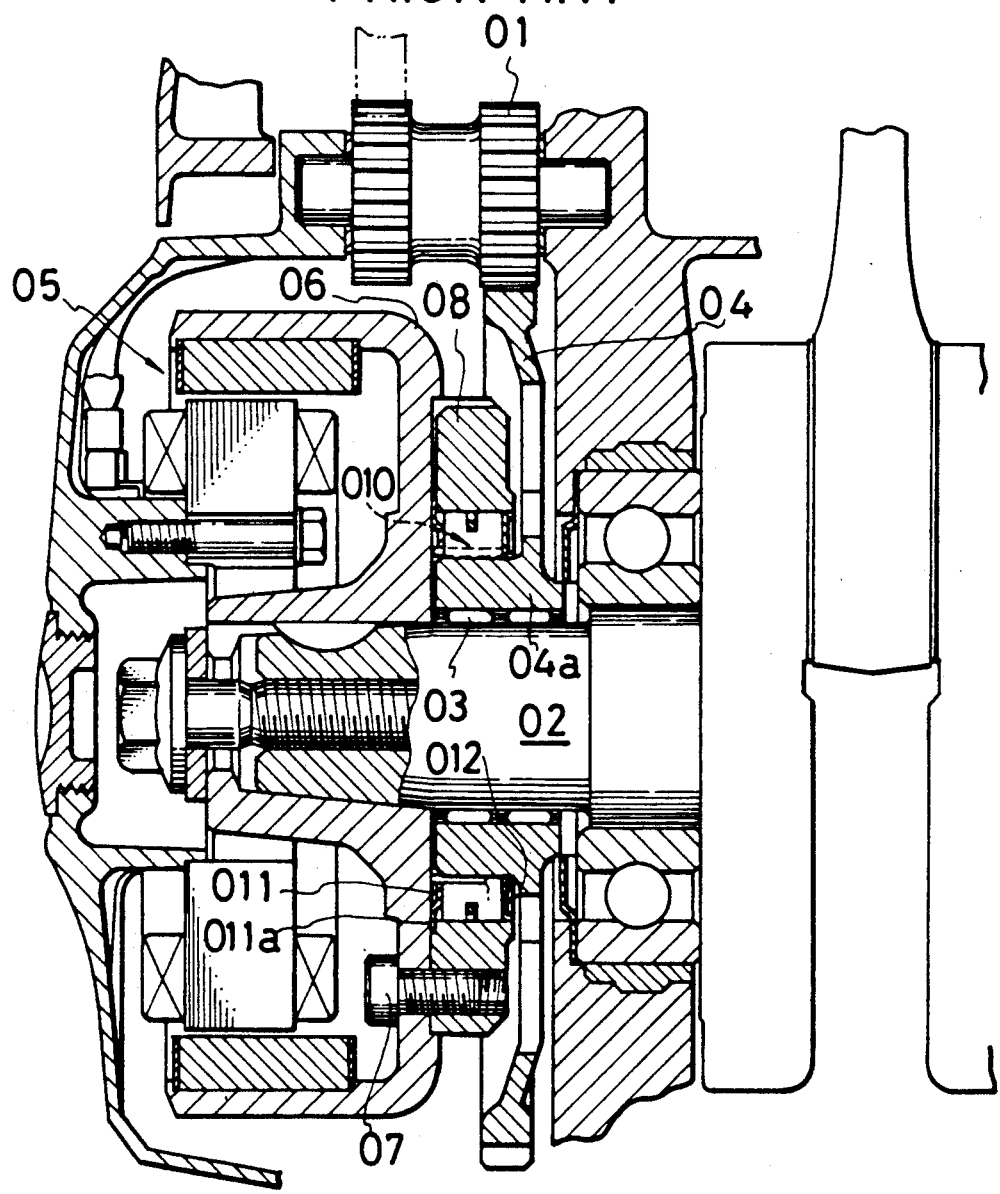
FIG. 1 is a cross-sectional view of a starter for a motorcycle engine in which a conventional one-way clutch is incorporated.
Figure 2:
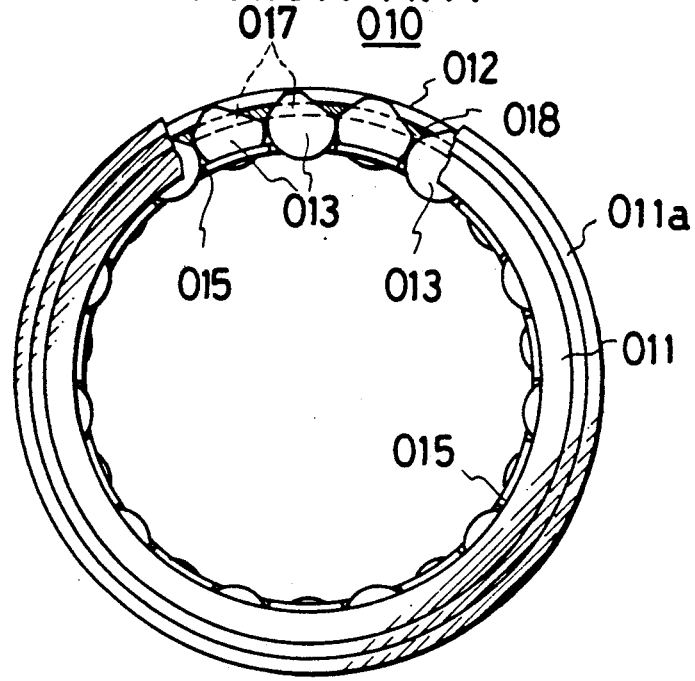
FIG. 2 is a front elevational view, partly cut away, of the conventional one-way clutch.
Figure 3:
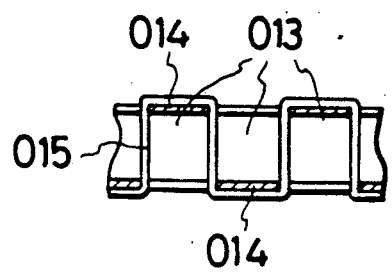
FIG. 3 is a view showing an inner peripheral surface of the one-way clutch.

The one-way clutch 10 may be installed in an engine starter as shown in FIG. 1 in place of the conventional one-way clutch 010. In this case the outer periphery of the one-way clutch 10 is held by the outer clutch member 08, and the boss 04a of the driven gear 04 is fitted in the inner periphery of the one-way clutch 10. It is now assumed that the outer clutch member 08 is at rest and the boss 04a is driven by the starter motor to rotate counterclockwise as indicated by the arrow a in FIG. 4. The cams 13 then tend to turn in the direction of the arrow b due to frictional forces between the cams 13 and the boss 04a and the cam surfaces 16 are pressed against the inner peripheral surface of the outer clutch member 08. Thus, the boss 04a, the one-way clutch 10 and the outer clutch member 08 rotate together in the direction of the arrow a. Conversely, when the boss 04a is at rest and the outer clutch member 08 is driven by the engine to rotate in the direction of the arrow a, the cams 13 are turned in the direction opposite to the direction of the arrow b due to frictional forces between the cams 13 and the outer clutch member 08, i.e., the cam surfaces 16 are displaced in a direction away from the inner peripheral surface of the outer clutch member 08. Since pressing forces are eliminated between the cams 13 and the boss 04a, the rotative power of the outer clutch member 08 is not transmitted to the boss 04a. Therefore, while the rotation of the starter motor is transmitted to the crankshaft 02, the rotation of the crankshaft 02 is not transmitted to the starter motor.

According to the present embodiment, the one-way clutch 10 is arranged to rotate with the outer clutch member 08 at all times to prevent wear on a flange portion 11a of the side plate 11 and the cam surfaces 16. To this end, the outer peripheral edge of the side plate 12 has a bent portion 19 formed by bending the outer peripheral edge axially outwardly. The bent portion or flange 19 has resilient members 20 formed by cutting portions thereof and raising them radially outwardly at equally spaced locations (three in the illustrated embodiment). The resilient members 20 have biasing forces tending to spring back outwardly under their own resiliency when they are pressed radially inwardly. Therefore, when the one-way clutch 10 is assembled in the hole of the outer clutch member 08, the resilient members 20 that have been pressed by the hole are pressed under their biasing forces against the inner wall of the hole, thereby producing intensive frictional forces between the resilient members 20 and the inner wall of the hole. The one-way clutch 10 now rotates with the outer clutch member 08 under such frictional forces.

Figure 7:
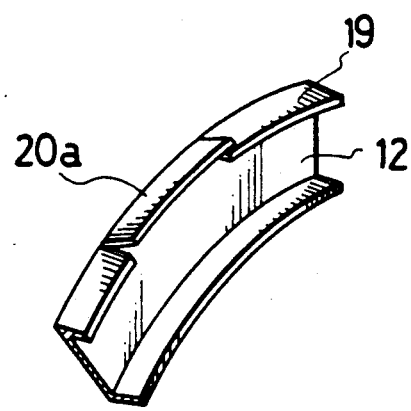
FIG. 7 is a view similar to FIG. 6 showing a modification thereof.

FIG. 7 shows a modification of the embodiment. While the resilient member 20 of the above-mentioned embodiment is raised circumferentially, the resilient member 20a of this modification is raised axially.

Figure 8:
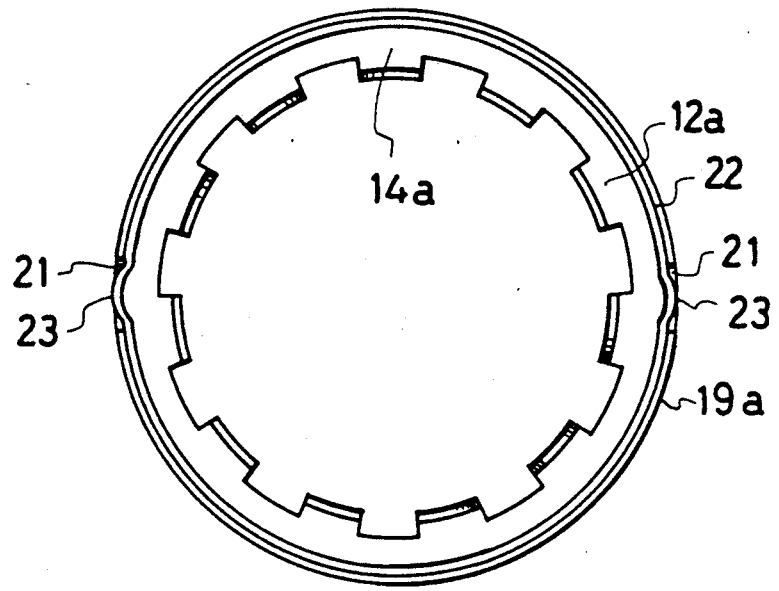
FIG. 8 is a front elevational view of a side plate according to a second embodiment of the present invention.

FIG. 8 is a front elevational view of a side plate 12a in accordance with a second embodiment of the present invention. The side plate 12a also has a bent portion 19a, identical to the bent portion 19 of the side plate 12, extending along the outer peripheral edge thereof. The inner peripheral edge of the side plate 12a has engaging portions 14a for engagement with the wire cage 15. In this embodiment, the bent portion 19a has two diametrically opposite recesses 21. A circlip 22 is forcibly placed along the inner peripheral surface of the bent portion 19a. The circlip 22 has curved portions 23 passing through the respective recesses 21 and projecting from the outer peripheral surface of the bent portion 19a. The curved portions 23 are urged radially outwardly under the resiliency of the circlip 22, and hence functions in the same way as the resilient members 20.

Figure 9:
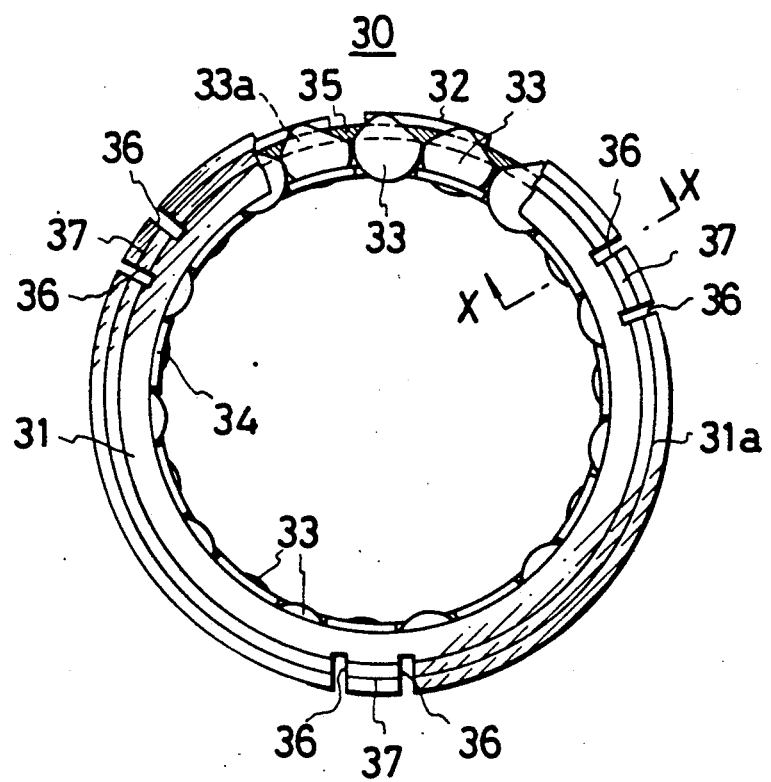
FIG. 9 is a front elevational view, partly cut away, of a one-way clutch according to a third embodiment of the present invention.
Figure 10:
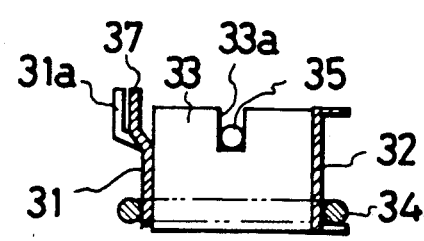
FIG. 10 is a cross-sectional view taken along line X—X of FIG. 9.
Figure 11:
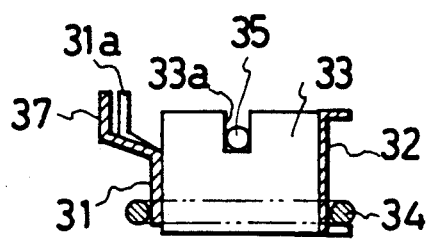
FIG. 11 is a view similar to FIG. 10 showing a modification thereof.

Referring next to FIGS. 9~11, a third embodiment of the present invention will be described.

As is conventional, a one-way clutch 30 comprises a pair of ring-shaped side plates 31, 32, a number of cams 33 disposed between the side plates 31, 32, a wire cage 34 engaging engaging portions on the inner peripheral edges of the side plates 31, 32 and sandwiching the cams 33 between the side plates 31, 32, and a ring-shaped coil spring 35 fitted in grooves 33a defined in the cams 33 and opening outwardly of the one-way clutch 30 for preventing the cams from being dislodged. The side plate 31 positioned closely to the rotor 06 of the AC generator 05 has a flange 31a bent outwardly.

The side plate 31 has a plurality of pairs (three in the illustrated embodiments) of cutout grooves 36 defined therein and extending inwardly from the outer peripheral edge thereof. The cutout grooves 36 in each pair form therebetween a tongue that is bent in the same direction as the axis of the one-way clutch 30 and displaced slightly with respect to the flange 31 into a resilient member 37.

More specifically, the resilient member 37 is displaced from the flange 31a toward the cams 33 as shown in FIG. 10, or displaced outwardly from the flange 31a as shown in FIG. 11. The former arrangement can sandwich the cams uniformly between the side plates 31, 32 since the side plate 31 is subject to less deformation when the one-way clutch is assembled in the engine starter.

With the one-way clutch 30 constructed as above, when the one-way clutch 30 is installed in the engine starter, the flange 31a and the resilient members 37 are sandwiched between the rotor 06 of the AC generator 05 and the outer clutch member 08 the resilient members 37 are displaced with respect to the flange 31a. Therefore, the frictional forces with which the side plate 31 is sandwiched are increased to enable the one-way clutch 30 to be rotated with the rotor 06 and the outer clutch member 08 at all times.

FIG. 12~23 show various other embodiments of the present invention. In these drawings, same reference numerals are used to designate similar parts as those of FIG. 4 or FIG. 1.

Figure 12:
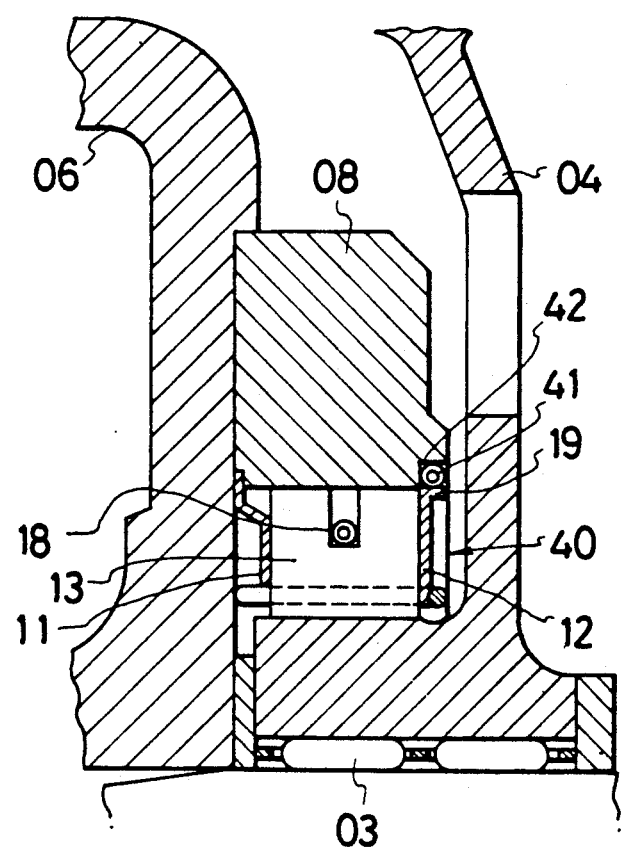
FIG. 12 is a partial cross-sectional view showing a fourth embodiment of the present invention.
Figure 13:
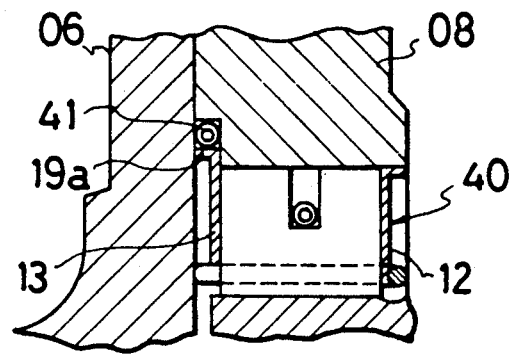
FIG. 13 shows a modification thereof.

FIG. 12 shows a fourth embodiment of the present invention. The one-way clutch 40 is incorporated with the engine starter shown in FIG. 1. The outer peripheral edge of the side plate 12 has a bent portion 19 formed by bending the outer peripheral edge axially outward. A spring ring 41 which has the same function as the resilient member 20 in FIG. 4 is wound round the peripheral surface of the bent portion 19 and fitted in a recess 42 formed on the inner peripheral surface of the outer clutch member 08. In FIG. 13, the spring ring 41 is wound round a peripheral surface of a bent portion 19a formed at the outer peripheral edge of the side plate 11.

Figure 15:
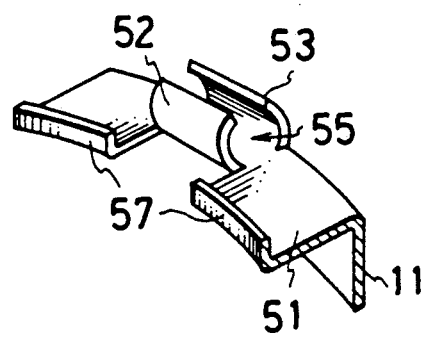
FIG. 15 is a perspective view of a portion of a side plate thereof.
Figure 14:
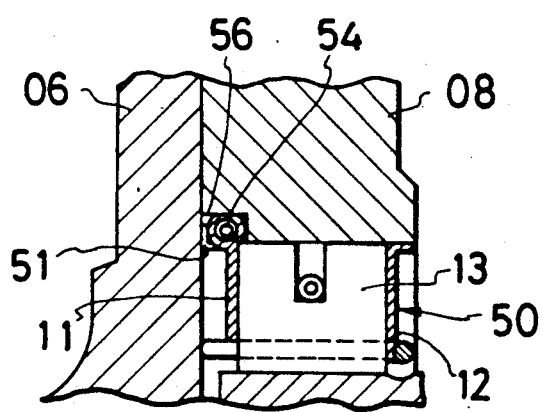
FIG. 14 is a partial cross-sectional view showing a fifth embodiment of the present invention.

FIGS. 14 and 15 show a fifth embodiment of the present invention in which the side plate 11 of the one-way clutch 50 is provided with a bent portion or flange 51 along the outer peripheral edge thereof. The bent portion 51 has rounded guide pieces 52 formed by cutting portions thereof and raising them, similar rounded guide pieces 53 being formed opposite to them. A spring ring 54 is wound through spaces 55 between both pieces 52 and 53. A recess 56 to hold the spring ring 54 is formed on the outer clutch member 08. The end of the bent portion 51 is further bent to form contact pieces 57 which contact with the rotor 06 for axial positioning of the side plate 11.

Figure 16:
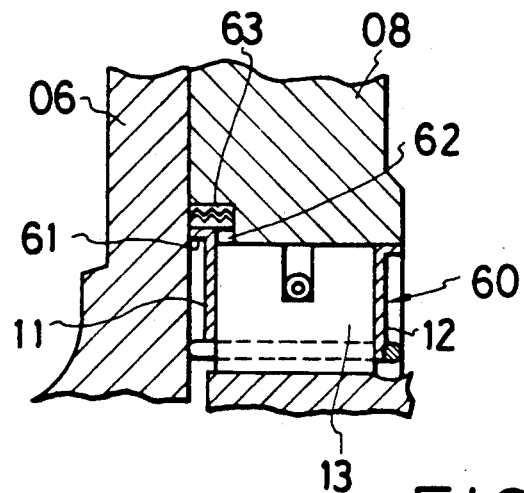
FIG. 16 is a partial cross-sectional view showing a sixth embodiment of the present invention.
Figure 17:
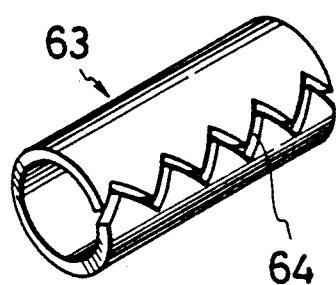
FIG. 17 is a perspective view of a spring pin thereof.

FIGS. 16 and 17 show a sixth embodiment of the present invention in which the side plate 11 of the one-way clutch 60 is provided with a bent portion 61 along the outer peripheral edge thereof. Recesses 62 adjacent to the bent portion 61 are formed on the inner peripheral surface of the outer clutch member 08 and cylindrical spring pins 63 are inserted axially into the respective recesses 62. The spring pin 63 has an axial wave-like split 64 so that it is resilient in the radial direction thereof and contacts with the bent portion 61 and the outer clutch member 08 with considerable frictional forces.

Figure 18:
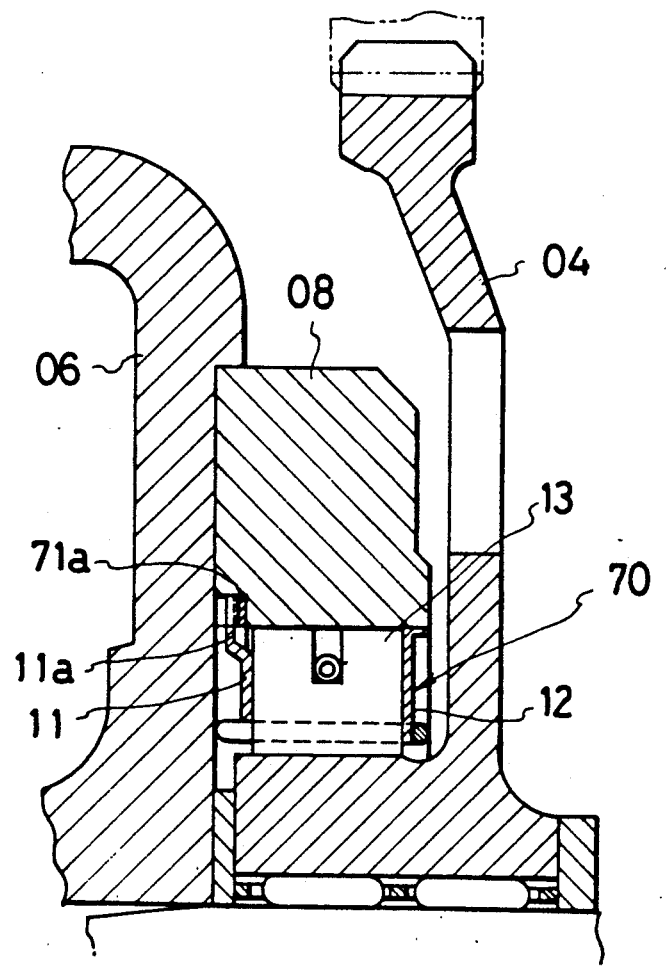
FIG. 18 is a partial cross-sectional view showing a seventh embodiment of the present invention.
Figure 19:
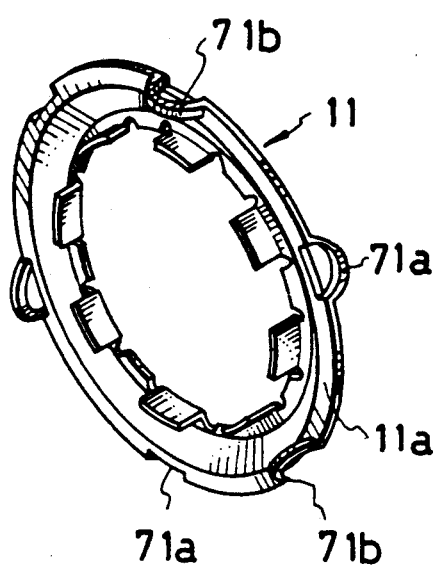
FIG. 19 is a perspective view of a side plate thereof.
Figure 20:
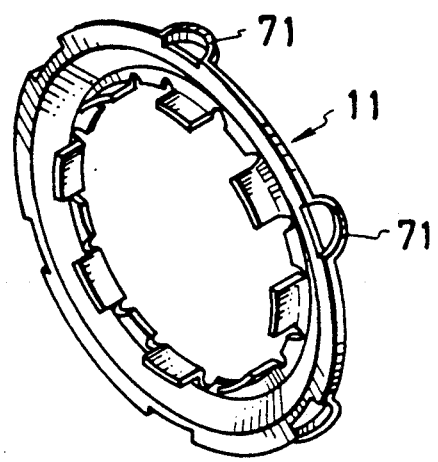
FIG. 20 and 21 are perspective views showing a modifications thereof respectively.
Figure 21:
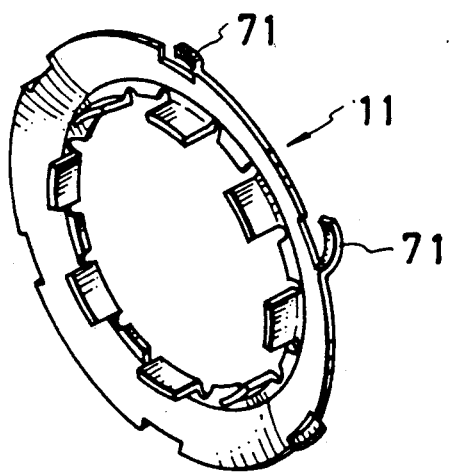

In the one-way clutch 70 shown in FIGS. 18 and 19 according to a seventh embodiment of the present invention, a slightly outwardly bent flange 11a of the side plate 11 has curved portions 71a and 71b projecting in a staggered manner from both side surfaces. The curved portions 71a and 71b are frictionally contact with the side surfaces of the rotor 06 and the outer clutch member 08 respectively by their own resiliency. The curved portions 71 can be arranged only on one side surface as shown in FIG. 20, or half cut as shown in FIG. 21.

Figure 22:
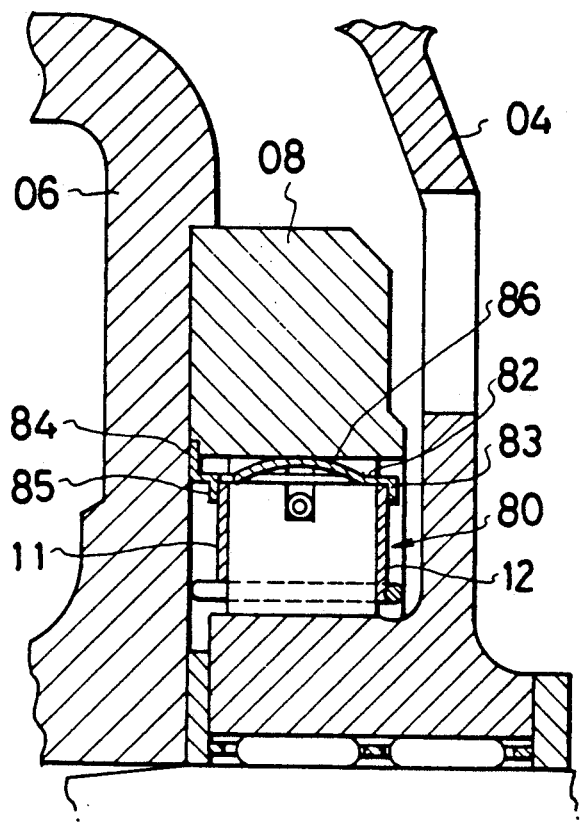
FIG. 22 is a partial cross-sectional view showing an eighth embodiment of the present invention.
Figure 23:
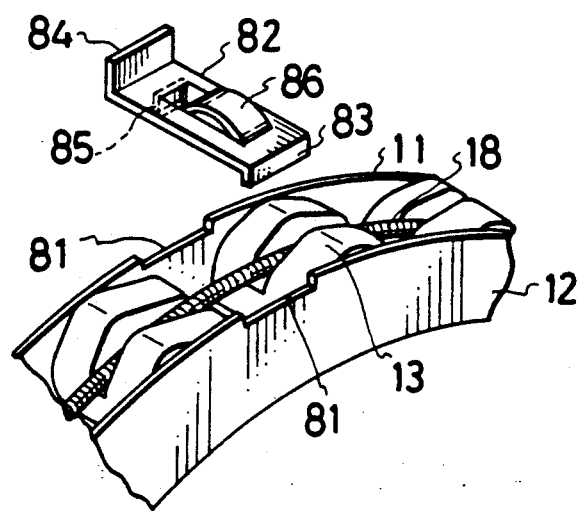
FIG. 23 is a partial perspective view of a broken up one-way clutch thereof.

In the one-way clutch 80 shown in FIGS. 22 and 23 according to a eighth embodiment of the present invention, pairs of cut-off portions 81 are formed on peripheries of the side plates 11 and 12 at regular intervals and a friction engaging member 82 is fitted in each pair of the cut-off portions 81. At both ends of the friction engaging member 82, a flange 83 contacting with a side surface of the side plate 12 and a flange 84 contacting with an end surface of the rotor 06 are provided. The flange 83 cooperates with a nail piece 85 formed by cutting a portion of the friction engaging member 82 to pinch the side plates 11 and 12 together from both sides. Another portion of the friction engaging member 82 is partially cut off and swelled radially outward to form a curved resilient member 86. The resilient member 86 has biasing force tending to spring back outwardly under its own resiliency when it is pressed radially inward. Therefore, when the one-way clutch 80 is assembled in the hole of the outer clutch member 08 as shown in FIG. 22, the resilient member 86 is pressed under its biasing force against the inner wall of the hole, so that the one-way clutch 80 rotates together with the outer clutch member 08 at all times under intensive frictional force between the resilient member 86 and the inner wall of the hole.

What is claimed is:

1. A one way clutch having a plurality of cams disposed in an annular space defined between concentrically opposed surfaces of an outer clutch means and an inner clutch member and held for pivotal movement between a pair of axially spaced, ring shaped side plates, characterized in that at least one of said side plates includes means for preventing relative sliding rotation between said at least one side plate and said outer clutch means, said means comprising a flange offset substantially perpendicularly from the plane of said side plate, and a friction member integrally formed on said side plate and resiliently biased outwardly from said flange into friction bearing engagement with said outer clutch means.

2. A one-way clutch according to claim 1, wherein said flange is defined by an axially bent portion having a peripheral surface extending axially from a radially outer peripheral edge of said one side plate and said friction member comprises a resilient member displaced radially outwardly from said peripheral surface.

3. A one-way clutch according to claim 2, wherein said friction member is connected sat one end to said peripheral surface of said flange and projects radially outwardly therefrom.

4. A one-way clutch according to claim 2, wherein said friction member is connected at one end to a peripheral edge of said side plate and projects radially outwardly from said flange.

5. A one-way clutch according to claim 1, wherein said friction member comprises a pair of mutually adjacent, opposed guide pieces integrally formed on said side plate flange at a position between said cams, and a resilient spring ring fitted in a space between said guide pieces and operative to resiliently bias said guide pieces radially outwardly.

6. A one way clutch having a plurality of cams disposed in an annular space defined between concentrically opposed surfaces of an outer clutch means and an inner clutch member and held for pivotal movement between a pair of axially spaced ring shaped side plates, characterized in that at least one of said side plates includes means for preventing relative sliding rotation between said at least one side plate and said outer clutch means, said means comprising a resilient tongue integrally formed between a pair of circumferentially spaced radial grooves formed in said at least one side plate, said tongue being laterally resiliently biased outwardly from a surface of said side plate into friction bearing engagement with said outer clutch means.

7. The one-way clutch of claim 6 characterized in that said at least one side plate contains a plurality of said tongues circumferentially spaced thereabout.

8. A one-way clutch for drivingly connecting concentrically disposed outer and inner clutch means for rotation in only one direction, comprising:

a plurality of circumferentially spaced cams;

means for retaining said cams between said clutch means including axially spaced ring-shaped side plates mounting said cams for pivotal movement;

said cams having surfaces including a first surface engageable by said inner clutch means when said inner clutch means is rotating in relation to said outer clutch means for pivoting said cams into binding engagement with said outer clutch means, and a second surface engageable by said outer clutch means when said outer clutch means is rotating in relation to said inner clutch means for rotating said cams into non-binding relation between said inner and outer clutch means; and at least one of said side plates including means for preventing relative sliding rotation between said at least one side plate and said outer clutch means, said means comprising a resilient tongue integrally formed between a pair of circumferentially spaced radial grooves formed in said at least one side plate and laterally displaced into friction bearing engagement with said outer clutch means.

9. The one-way clutch of claim 8 characterized in that said at least one side plate contains a plurality of said tongues circumferentially spaced thereabout.

* * * * *